Dec. 9, 1930.  B. B. ELLERBECK  1,784,279
CONVERTIBLE AUTOMOBILE TOP
Filed Jan. 7, 1929

Inventor
B. B. Ellerbeck

Patented Dec. 9, 1930

1,784,279

UNITED STATES PATENT OFFICE

BEN BROWN ELLERBECK, OF SALT LAKE CITY, UTAH

CONVERTIBLE AUTOMOBILE TOP

Application filed January 7, 1929. Serial No. 330,702.

My present invention relates to automobile tops of the rigid type, as distinguished from flexible foldable tops, and has for an object the provision of an arrangement especially for the roadster type of automobile whereby the rigid top may be easily moved from a position where it serves as a cover for the forward seating compartment to a position directly in the rear of this compartment, so that the forward portion of the top which has a window in the roof surface will provide, when in this latter position, a transparent windshield for a rear seating compartment. A second object is to provide a top of fixed shape which may be moved from one position to the other without the operator being required to leave the driving compartment to manipulate the top, or being required to open up the deck in any manner to effect this manipulation. A further object is to provide a rigid top which is disposable in small space within the automobile body and still allow the rear deck to be used as a seating compartment wherein the deck seat is either over or somewhat forward in respect to the rear axle of the car, thereby being of conventional design.

This invention is distinguished from those styles of rigid tops which are hinged at their extreme rear lower edge to the automobile body and are turned over backward to rest in an upside down position in the rear deck where they destroy the usual rear seating arrangement and have no useful function in this lowered position. This invention is also distinguished from such styles of rigid tops as those which swing on a stationary pivot, since such pivoting does not allow a rigid top to be properly proportioned according to accepted standards of automobile design, and such tops do not serve any useful purpose when they are in the lowered or inactive position.

The preferred manner of carrying out this invention is illustrated in the accompanying drawing, in which.

Figure 1:
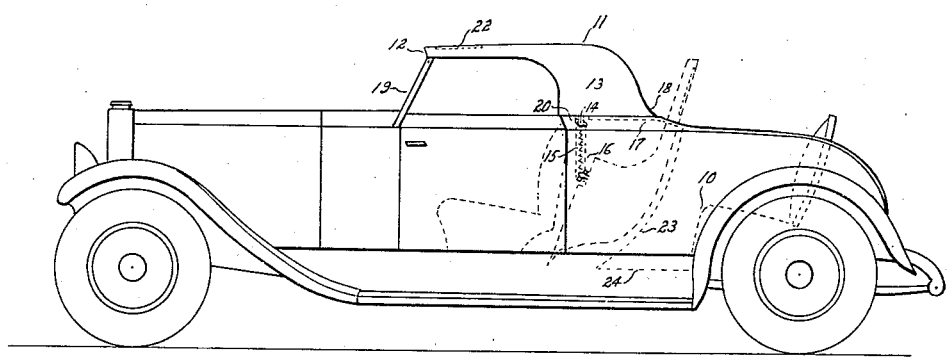
Figure 1 is a side view of an automobile equipped with my type of rigid top, the latter being illustrated in full and dotted lines respectively in its raised and lowered positions.

Referring now to Fig. 1, I have illustrated an automobile body of the general roadster type having the conventional rear deck with a deck seat 10, and have shown the forward seating compartment covered by a rigid or fixed shape top 11 which clamps to the windshield in the usual manner at 12. Near the forward edge of the side walls 13 of the top, and somewhat below their lower edges, a pivot 14 is extended out from the wall on each side of the top. These pivots rest on coil springs 15 which are carried in approximately vertical channels 16 on the inner face of the body sides. The lower edges of the side walls of the top, from a point just back of the pivot, are flared outward to form a lip as indicated by the dotted line 17 which bears up against the under side of the inwardly turned over edges of the body sides. The lower portion of the rear wall 18 of the top is flared backward several inches so that the edge of the deck surface, under which it bears, is sufficiently far back from the main portion of the rear wall to allow the top in its subsequent lowered position to be properly placed. A rubber insulating strip may be placed around the lower edges of the top so as to provide a weather and rattle proof junction where they bear up against the body surface when the top is in the raised position and clamped to the windshield 19. The top in this position is held firmly at the top of the channels 16 by a simple locking device 20 adjacent to the pivot. With the top in the raised position, the driving compartment may be completely closed in by racking up windows carried in the doors, thus providing a coupé type of body.

Figure 2:
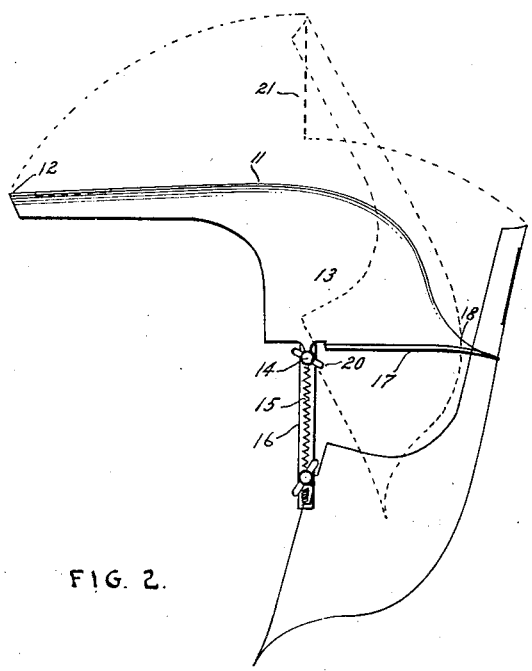
Figure 2 shows the positions of the top during its manipulation.

To lower the top and convert the coupé type of body into an uncovered roadster type, the top is released from the windshield 19 and rotated backwards about the pivots 14, as illustrated in Fig. 2, until the front edge 12 of the top is directly above the channels 16, in which position the locking lugs 20 are disengaged. The top is then pushed downward, the pivots sliding down the channels and compressing the cushioning springs 15. When the top has been lowered vertically through the proper distance, as indicated by the dotted line 21, it is rotated further backward on the pivots until it has reached the proper inclination as indicated.

Referring again to Fig. 1, the top in its final lowered position is shown in dotted lines, inclining backward and extending above the deck surface approximately the same height as the forward windshield 19. The forward roof portion of the top has a transparent section or window indicated by the dotted line 22. This portion of the top thus becomes a transparent windshield for the deck seat compartment, and the top thus serves a useful purpose in the lowered position. A forward deck wall indicated by the dotted line 23 prevents abrasion of the top, when lowered, by luggage or occupants of the deck. To provide ample leg room, the floor of the deck may be built low as indicated by the dotted line 24.

As the prevailing tread of automobile body design is to build high body sides and low tops of well rounded contour, it is apparent that this rigid top is in keeping with modern design and appearance. It is further apparent that this top is operative from the driver's seat, that it serves as a rear windshield when lowered, is economical of space, and allows a conventional deck seat construction.

I claim:

1. The combination with an automobile body having a deck seat compartment in the rear of a front driving compartment, of a rigid top having a roof portion that contains a transparent forward section, side and rear walls having outwardly flared lower edges to form an upwardly pressing lip against the deck and adjacent body surfaces, and pivots extending laterally from the lower forward portion of the side walls and resting on cushioning springs held in channels, the said top being rotatable backwardly on said pivots and movable downwardly into the body to such position that the forward transparent roof section extends above the body to form a properly inclined windshield for the deck seat compartment.

2. The combination with an automobile body having a deck seat compartment in the rear of a front driving compartment, of a non-deformable top having an upper surface which is substantially flat and which contains a transparent portion directly in rear of the point of fastening to the windshield, and side and rear walls flared outwardly at their lower edges to form an upwardly pressing lip against the deck and adjacent body surfaces so that the edges of these surfaces will be so positioned as to allow said top to have rotational clearance during a lowering movement which results in the top being partially housed in the body, the transparent roof portion extending above the body to form a windshield for the deck seat compartment when said top is in lowered position.

3. In combination with an automobile body of the general roadster type; a fixed shape top of non-circular longitudinal contour having side and rear walls, a transparent roof portion, and a rearwardly extending flange adjacent to the lower edge of the rear wall and making contact at its rear edge with the forward edge of the deck surface so that the latter edge will be positioned some distance behind the rear wall of the top to allow clearance between the top and the body during a combined rotational and linear displacement of said top to a partially housed position within the body; and cushioned pivotal connections to allow such displacement.

4. In combination with an automobile body of the general roadster type, a rigid top having a transparent roof portion rearwardly of the point of fastening to the windshield, connections between the top and the body to allow simultaneous rotational and linear movement of the top to a position where the rear portion of the top is housed within the body, and the forward portion containing the transparent section extends above the body to serve as a windshield back of the driver's seat, as described.

BEN BROWN ELLERBECK.